United States Patent Office 3,709,898
Patented Jan. 9, 1973

3,709,898
PROCESS FOR THE PRODUCTION OF TRIAZOLO-
BENZODIAZEPINES AND INTERMEDIATES
Jackson B. Hester, Jr., Galesburg, Mich., assignor to The
Upjohn Company, Kalamazoo, Mich.
No Drawing. Filed Feb. 9, 1971, Ser. No. 114,049
Int. Cl. C07d 33/52, 55/06, 57/02
U.S. Cl. 260—308 R          13 Claims

ABSTRACT OF THE DISCLOSURE

A multistep process for the production of triazolobenzodiazepines of the Formula 1:

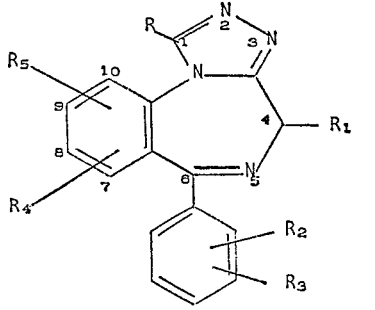

wherein R is selected from the group consisting of hydrogen and alkyl of 1 to 3 carbon atoms, inclusive; wherein $R_1$ is hydrogen or alkyl defined as above; and wherein $R_2$, $R_3$, $R_4$, and $R_5$ are selected from the group consisting of hydrogen, alkyl defined as above, fluorine, chlorine, bromine, nitro, cyano, trifluoromethyl, alkoxy of 1 to 3 carbon atoms, inclusive, amino, alkanoylamino in which the alkanoyl group is of 1 to 3 carbon atoms, inclusive, alkylthio, in which the alkyl group is defined as above, alkylsulfinyl, in which the alkyl group is defined as above, and dialkylamino, in which the alkyl group is defined as above, and for some of intermediates is claimed. The final compounds and intermediates are tranquilizers and sedatives and are useful in mammals, including man and birds.

BACKGROUND OF THE INVENTION

Field of the invention

This invention is directed to a new process for organic compounds and is particularly concerned with a process for 6 - phenyl-4H-s-triazolo[]4,3-a][1,4]benzodiazepines and intermediates.

The novel compounds and the process of production therefor can be illustratively represented as follows:

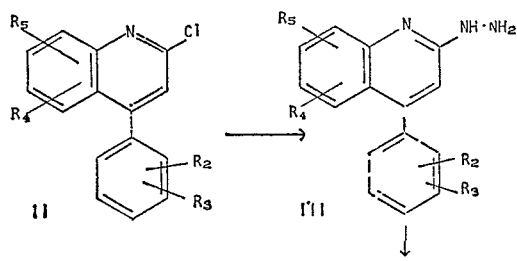

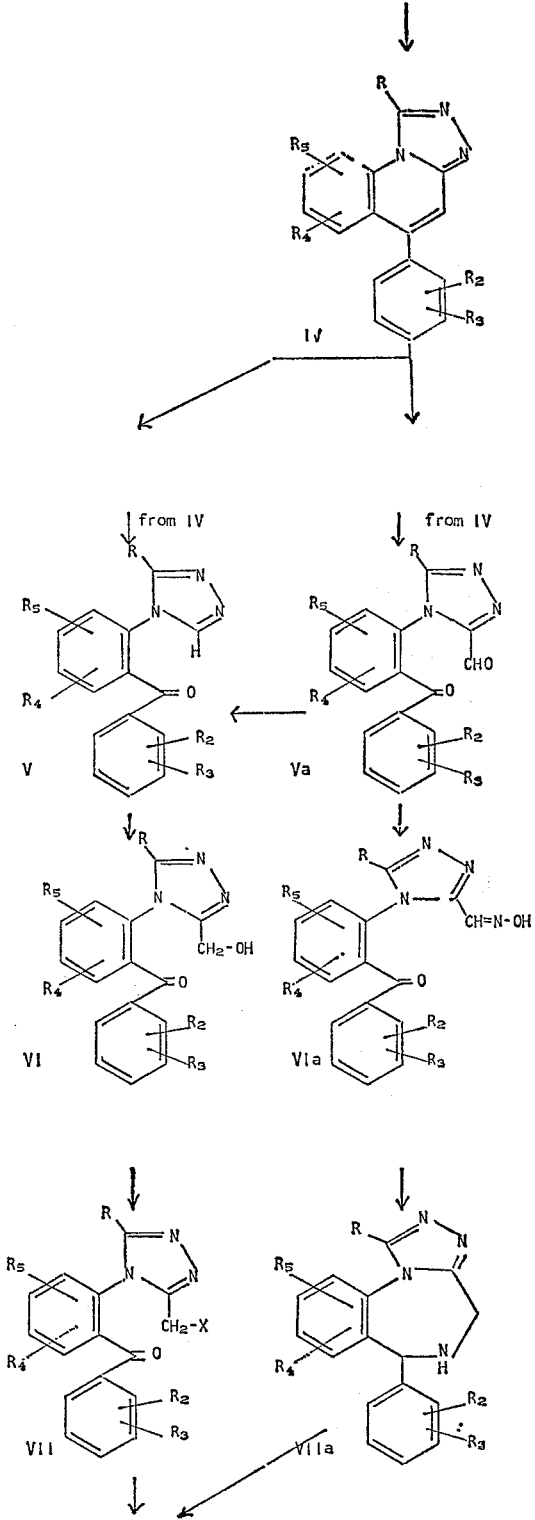

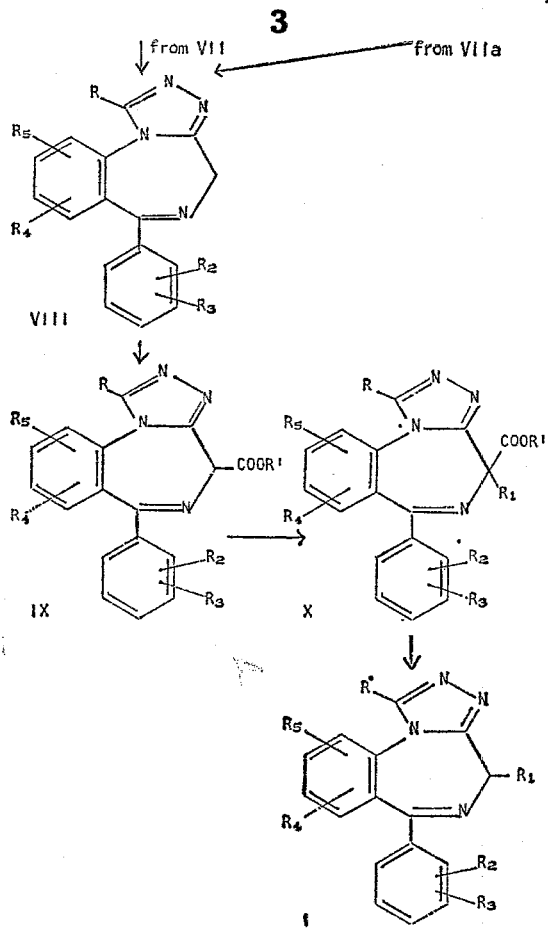

wherein R is selected from the group consisting of hydrogen, alkyl of 1 to 3 carbon atoms, inclusive; wherein $R_1$ is hydrogen or alkyl, defined as above; wherein $R_2$, $R_3$, $R_4$, and $R_5$ are selected from the group consisting of hydrogen, alkyl defined as above, fluorine, chlorine, bromine, nitro, cyano, trifluoromethyl, alkoxy of 1 to 3 carbon atoms, inclusive, amino, alkanoylamino, in which the alkanoyl group is of 1 to 3 carbon atoms, inclusive, alkylthio in which the alkyl group is defined as above, alkylsulfinyl in which the alkyl group is defined as above, and dialkylamino in which the alkyl group is defined as above; wherein X is halogen; and wherein R' is alkyl, defined as above.

The process of this invention comprises:

(1) Refluxing a 2-chloro-4-phenylquinoline (II) with hydrazine hydrate to give a 2-hydrazino-4-phenylquinoline (III);

(2) Refluxing the 2-hydrazino-4-phenylquinoline (III) with a trialkyl orthoacylate e.g. with triethyl orthoformate, triethyl orthoacetate, triethyl or orthopropionate or trimethyl orthobutyrate, in an inert organic solvent to give the corresponding 1-substituted-5-phenyl-s-triazolo[4,3-a] quinoline (IV);

(3) Treating (IV) with an oxidizing agent or system such as ruthenium dioxide and sodium periodate or ozone in an inert solvent at low temperature to give a mixture containing mainly a 2-(3-substituted-4H-1,2,4-triazol-4-yl)benzophenone (V) and a 4-(2-benzoylphenyl)-5-substituted 4H-1,2,4-triazole-3-carboxaldehyde (Va);

(4) Treating (V) with formaldehyde to obtain a 2-[3-(hydroxymethyl)-5-substituted-4H-1,2,4-triazol-4-yl]benzophenone (VI); the carboxaldehyde Va can be converted to compound V with an oxidizing agent.

(5) Converting alcohol VI to a halide with a halogenating agent such as phosphorus tribromide, phosphorus oxychloride, phosphorus triiodide, or thionyl chloride to obtain the corresponding 2-[3-(halomethyl)-5-substituted-4H-1,2,4-triazol-4-yl]benzophenone (VII);

(6) Treating (VII) with ammonia to give the corresponding 1 - substituted - 6-phenyl-4H-s-triazolo[4,3-a][1,4]benzodiazepine VIII;

(7) Treating VIII with a lower dialkyl carbonate wherein the alkyl is of 1 to 3 carbon atoms, inclusive, in the presence of a strong base e.g. sodium hydride gives the corresponding 1 - substituted-6-phenyl-4H-s-triazolo[4,3-a][1,4]benzodiazepine-4-carboxylic acid alkyl ester (IX);

(8) Treating IX with an alkyl halide in the presence of a strong base, e.g. sodium hydride to give the corresponding 1 - substituted - 4-alkyl-6-phenyl-4H-s-triazolo[4,3-a][1,4]benzodiazepine-4-carboxylic acid alkyl ester (X);

(9) Saponifying X with a strong base e.g. sodium or potassium hydroxide in a lower alkanol e.g. methanol, ethanol or 2-propanol to give after neutralization the corresponding 1 - substituted-4-alkyl-6-phenyl-4H-s-triazolo[4,3-a][1,4]benzodiazepine (I).

Alternatively, the 4 - (2-benzoylphenyl)-5-substituted 4H-1,2,4-triazole-3-carboxaldehyde (Va) can be heated with a hydroxylamine salt and a base in a solvent to give the corresponding 4-(2-benzoylphenyl)-5-substituted-4H-1,2,4-triazole-3-carboxaldehyde-3-oxime (VIa) which by catalytic hydrogenation gives the corresponding 5,6-dihydro-1-substituted-6-phenyl-4H-s-triazolo[4,3-a][1,4]benzodiazepine VIIa. Compound VIIa when heated with diethyl azodicarboxylate in an organic inert solvent e.g. benzene, gives the corresponding 1-substituted-6-phenyl-4H-s-triazolo[4,3-a][1,4]benzodiazepine VIII.

Alternatively, the 4-carboxylate (IX) can be converted to a 1-substituted-6-phenyl-4H-s-triazolo[4,3-a][1,4]benzodiazepine by hydrolysis with a strong base e.g. aqueous 1 N sodium hydroxide and subsequent neutralization of the sodium salt thus formed.

DESCRIPTION OF THE PREFERRED EMBODIMENT

Lower alkyl groups of 1 to 3 carbon atoms, inclusive, are exemplified by methyl, ethyl, propyl and isopropyl.

The carbon chain moiety of alkoxy, alkylthio, alkylsulfinyl, dialkylamino which is of 1 to 3 carbon atoms, inclusive, and is defined as lower-alkyl of 1 to 3 carbon atoms, inclusive, above.

Thus, alkoxy can be methoxy, ethoxy, propoxy and isopropoxy, alkylthio can be methylthio, ethylthio, propylthio, isopropylthio; alkylsulfinyl can be methylsulfinyl, ethylsulfinyl, propylsulfinyl, and isopropylsulfinyl; dialkylamino can be dimethylamino, diethylamino, dipropylamino, and diisopropylamino.

The alkanoylamino group of 1 to 3 carbon atoms consists of formamido

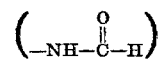

acetamido and propionamido.

The compounds of the Formulae I including acid addition salts thereof have sedative, tranquilizing, and muscle relaxant effects in mammals, including man and birds.

The acid addition salts of compounds of Formula I contemplated in this invention, are the hydrochlorides, hydrobromides, hydroiodides, sulfates, phosphates, cyclohexanesulfamates, methanesulfonates and the like, prepared by reacting a compound of Formula I with an excess of the selected pharmacologically acceptable acid.

Sedative effects of 8-chloro-1-methyl-6-phenyl-4H-s-triazolo[4,3-a][1,4]benzodiazepine are shown by the following tests in mice:

Chimney test.—[Med. Exp. 4, 11 (1961)]: The effective intraperitoneal dosage for 50% of the mice ($ED_{50}$) is 0.09 mg./kg.; the oral $ED_{50}$ is 0.6 mg./kg. The test determines the ability of mice to back up and out of a vertical glass cylinder within 30 seconds. At the effective dosage, 50% of the mice failed doing it.

Dish test.—Mice in Petri dishes (10 cm. diameter, 5 cm. high, partially embedded in wood shavings), climb out in a very short time, when not treated. Mice remaining in the dish for more than 3 minutes indicates tranquilization. $ED_{50}$ equals the dose of the test compound at which 60% of the mice remain in the dish. The $ED_{50}$ (intraperitoneal administration) in this test is 0.15 mg./kg.; the oral $ED_{50}$ is 0.045 mg./kg.

Pedestal test.—The untreated mouse leaves the pedestal in less than a minute to climb back to the floor of the standard mouse box. Tranquilized mice will stay on the pedestal for more than 1 minute. The $ED_{50}$ (intraperitoneal administration) is 0.20 mg./kg.; the $ED_{50}$ (oral administration) is 0.9 mg./kg.

Nicotine antagonism test.—Mice in a group of 6 are injected with the test compound (8-chloro-1-methyl-6-phenyl-4H-s-triazolo[4,3-a][1,4]benzodiazepine). Thirty minutes later the mice including control (untreated) mice are injected with nicotine salicylate (2 mg./kg.). The control mice show overstimulation, i.e., (1) running convulsions followed by (2) tonic extensor fits followed by (3) death. An intraperitoneal dosage of 0.1 mg./kg. of the test compound protected 50% of the mice against (2) and (3) ($ED_{50}$); the oral $ED_{50}$ is 0.04 mg./kg.

Antagonism to strychnine (as sulfate).—The effective dosage ($ED_{50}$) of 8-chloro-1-methyl-6-phenyl-4H-s-triazolo[4,3-a][1,4]benzodiazepine is 1 mg./kg. orally in mice. The test consists in orally administering into groups of 6 mice the test compound, 8-chloro-1-methyl-6-phenyl-4H-s-triazolo[4,3-a][1,4]-benzodiazepine, and 30 minutes later 3 mg./kg. strychnine sulfate intraperitoneally. The survivors after 4 hours reflect the activity of the compound as a muscle relaxant and antispasmodic. A dosage of 3 mg./kg. of strychnine sulfate is routinely fatal to all the control mice.

The following compounds have an (by intraperitoneal injection) $ED_{50}$ as shown in Table I below:

TABLE I

| Compound | $ED_{50}$ (in mg./kg.) | | | |
|---|---|---|---|---|
| | Ch | D | P | Ni |
| 8-chloro-1-methyl-6-(2,6-difluorophenyl)-4H-s-triazolo[4,3-a][1,4]benzodiazepine | 0.009 | 0.016 | 0.020 | 0.018 |
| 8-chloro-1-ethyl-6-phenyl-4H-s-triazolo[4,3-a][1,4]benzodiazepine | 0.8 | 0.9 | 0.9 | 0.2 |
| 8-chloro-6-phenyl-4H-s-triazolo[4,3-a][1,4]benzodiazepine | 0.8 | 0.9 | 0.9 | 0.2 |
| 8-chloro-6-phenyl-4H-s-triazolo[4,3-a][1,4]benzodiazepine | 0.25 | 0.4 | 0.7 | 0.08 |
| 8-trifluoromethyl-1-methyl-6-phenyl-4H-s-triazolo[4,3-a][1,4]benzodiazepine | 0.16 | 0.16 | 0.22 | 0.08 |
| 8-chloro-1-methyl-6-(o-chlorophenyl)-4H-s-triazolo[4,3-a][1,4]benzodiazepine | 0.05 | 0.028 | 0.045 | 0.008 |
| 8-chloro-1-methyl-6-(o-fluorophenyl)-4H-s-triazolo[4,3-a][1,4]benzodiazepine | 0.056 | 0.016 | 0.028 | 0.009 |

NOTE.—Ch=Chimney test; D=Dish test; P=Pedestal test; Ni= nicotine antagonism (3) test.

The intermediates of Formulae IV, V, Va, VI, VIa, VII, VIIa, IX and X are also active tranquilizers and sedatives, but of lesser activity, as can be seen from Table II:

TABLE II

| Compound | $ED_{50}$ (in mg./kg.) | | | |
|---|---|---|---|---|
| | Ch | D | P | Ni |
| 2-[3-(bromomethyl)-5-methyl-4H-1,2,4-triazol-4-yl]-5-chlorobenzophenone | 50 | >200 | >200 | 142 |
| 4-(2-benzoyl-4-chlorophenyl)-5-methyl-4H-1,2,4-triazol-3-carboxaldehyde-3-oxime | 79 | 35 | 25 | 112 |
| 4-(2-benzoyl-4-chlorophenyl)-5-methyl-4H-1,2,4-triazole-3-carboxaldehyde methanol solvate | 23 | 28 | 23 | 18 |
| 5-chloro-2-(3-methyl-4H-1,2,4-triazol-4-yl)benzophenone | 28 | 23 | 20 | 20 |
| 7-chloro-1-methyl-5-phenyl-s-triazolo[4,3-a]quinoline | 71 | >200 | 126 | 112 |
| 5-chloro-2-[3-(iodomethyl)-5-methyl-4H-1,2,4-triazol-4-yl]benzophenone | <25 | >50 | >50 | 50 |
| 5-chloro-2-[3-(hydroxymethyl)-5-methyl-4H-1,2,4-triazol-4-yl]benzophenone | 35 | 89 | >200 | 50 |
| 8-chloro-5,6-dihydro-1-methyl-6-phenyl-4H-s-triazolo[4,3-a][1,4]benzodiazepine | 3.1 | 5 | >6.3 | 0.7 |
| 8-chloro-1-methyl-6-phenyl-4H-s-triazolo[4,3-a][1,4]benzodiazepine-4-carboxylic acid ethyl ester | 36 | 7 | 16 | 45 |
| 8-chloro-1,4-dimethyl-6-phenyl-4H-s-triazolo[4,3-a][1,4]benzodiazepine-4-carboxylic acid ethyl ester | 56 | 56 | 22 | 18 |

The pharmaceutical forms contemplated by this invention include pharmaceutical compositions suited for oral, parenteral and rectal use, e.g., tablets, powder packets, cachets, dragees, capsules, solutions, suspensions, sterile injectable forms, suppositories, bougies, and the like. Suitable diluents or carriers such as carbohydrates (lactose), proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil may be used for preparing solutions or suspensions of the active drugs. Sweetening, coloring and flavoring agents may be added.

For mammals and birds, food premixes, with starch, oatmeal, dried fishmeat, fishmeal, flour and the like can be prepared.

As tranquilizers, the compounds of Formula I can be used in dosages of 0.01–2.0 mg./kg. in oral or injectable preparations as described above, to alleviate tension and anxiety in mammals, or birds, such as e.g., occurs when animals are in travel.

For intermediates such as compounds IV, V, Va, VI, VIa, VII, VIIa, IX, and X, the dosages are higher, such as from 5–200 mg./kg.

The starting materials of Formula II of this invention, substituted and unsubstituted 2-chloro-4-phenylquinolines, are partially known in the art e.g. G. A. Reynolds and C. R. Hauser, J. Am. Chem. Soc. 72, 1852 (1950) or are prepared according to the methods shown in the preparations.

In carrying out the process of the present invention, a 2-hydrazino-4-phenyl quinoline II is heated with hydrazine hydrate. In the preferred embodiment of this invention, the reaction is carried out at the reflux temperature of the mixture; however, temperatures between 25 and 118° C. with a reaction time of 1 to 18 hours are operative. A solvent, such as lower alkanol, e.g. methanol, ethanol, 1- and 2-propanol can be used but is not necessary. In the preferred embodiment of the invention, one hour reflux under nitrogen is sufficient. At the termination of the reaction, the mixture is concentrated, poured into water and the insoluble product collected on a filter. Purification is carried out by conventional means such as extraction, chromatography or more commonly recrystallization to obtain the corresponding 2-hydrazino-4-phenylquinoline III.

Compound III is converted to the corresponding 1-substituted-5-phenyl-s-triazolo[4,3-a]quinoline (IV) by heating with an ortho lower alkanol ester of a carboxylic acid e.g. trimethyl or triethyl orthoacetate. Temperatures between 80–170° C. are operative in this reaction. Solvents such as heptane, octane, methylcyclohexane, benzene, toluene, xylene (o, m, or p) can be used but are not necessary. In the preferred embodiment of this invention, the reaction is carried out in a nitrogen atmosphere with a higher boiling solvent e.g. xylene, at the reflux temperature of the reaction mixture. Lower alkanols, produced during the reaction by decomposition of the ortho ester, can be removed by distillation. The product IV is recovered and purified by conventional procedures e.g. concentration of the reaction mixture to dryness, extraction, chromatography and/or recrystallization.

Oxidation of compound IV, depending on the oxidizing agent and reaction conditions used, produces 2-(3-substituted-4H-1,2,4-triazol-4-yl)benzophenone and/or 4-(2-benzoylphenyl)-5-substituted-4H-1,2,4-triazole-3-carboxaldehyde (Va). The oxidation can be carried out with sodium periodate using potassium permanganate or ruthenium dioxide as catalysts or with ozone and the like. With ozone, also 1-substituted-5-phenyl-s-triazolo[4,3-a]quinolin-4(5H)-one was obtained besides compounds V and Va. The oxidation with ruthenium dioxide and sodium periodate is performed between zero and 30° C. for a period of 2 to 24 hours. The sodium periodate is used in excess of 5–100 times by weight compared to the weight of ruthenium oxide. Mixtures of water and acetone are used as solvents. The reaction mixture can be filtered or first concentrated and then filtered, and the pure products can be obtained by conventional means e.g. extraction, chromatography, recrystallization, combination of these methods and the like. The reaction can also be terminated by the addition of sodium iodide and sodium thiosulfate. This method of terminating the reaction is particularly useful, if an organic reagent is used as oxidant. In the ozone oxidation procedure, temperatures of 0–30° C. are used during 12 to 24 hours and a solvent or a solvent system of inert organic solvents e.g. methanol, ethanol, methylene chloride, chloroform or a combination thereof and the like.

Compound V is converted to the corresponding 2-[3-(hydroxymethyl)-5-substituted-4H-1,2,4-triazol - 4 - yl]benzophenone (VI) by heating it with formaldehyde in a solvent. Aqueous formaldehyde at 100–150° for 3 to 18 hours in a sealed tube system is operative. In the preferred embodiment of this invention excess of paraformaldehyde in an inert solvent such as toluene, xylenes, isooctane, boiling between 100–140° C. is used. At this temperature 3 to 18 hours is sufficient for the reaction. The product (VI) is isolated and purified with conventional methods such as chromatography, extraction, recrystallization, or the like.

Compound VI is converted to a 2-[3-(halomethyl)-5-substituted-4H-1,2,4-triazol-4-yl]benzophenone (VII) by treating a solution of compound VI with a halogenating agent such as thionyl chloride or bromide, phosphorus oxychloride, phosphorus trichloride, tribromide, or triiodide. Inert solvents are used in this reaction e.g. benzene, toluene, methylene chloride, chloroform, carbon tetrachloride and the like. With thionyl chloride reaction temperatures of 50–80° C. are employed, whereas with the phosphorus halides in chlorinated hydrocarbons temperatures of 0 to 25° C. are preferred. The iodide of Formula VII can also be made by an exchange reaction such as treating a chloride of Formula VII with sodium iodide in acetone for 2 to 8 hours at 25–55° C. When the reaction is terminated, the products of Formula VII are isolated and purified in conventional manner e.g. chromatography, extraction, recrystallization and the like.

Compound VII is cyclized to 1-substituted-6-phenyl-4H-s-triazolo[4,3-a][1,4]benzodiazepine VIII by treating compound VII with a non-aqueous solution of ammonia. In the preferred embodiment of this invention tetrahydrofuran, methanol, ethanol, methylene chloride, ether and the like can be used; anhydrous ammonia without a solvent at its boiling temperature (−33° C.) can also be used. In the preferred embodiment of the invention a solvent is used at a temperature between 0–30° C. during 18–72 hours. The product is isolated and purified, at the termination of the reaction, by conventional procedures e.g. extraction, chromatography, recrystallization and the like to provide compound VIII.

In conventional manner, compound VIII by treatment with a lower dialkyl carbonate in the presence of a strong base like sodium hydride, at temperatures between 90–170° C., can be converted to the corresponding 4-alkyl carboxylate of structure (IX). This product by alkylation with an alkyl halide in the presence of an alkali metal hydride or alkoxide gives the 4-alkyl derivatives having the Formula X, which by saponification with a strong base followed by neutralization with acid gives the 4-alkyl derivative of compound VIII wherein $R_1$ is alkyl.

The principal compound (VIII) can also be made:
(1) By hydrolyzing compound IX with a strong base such as 1 N potassium or sodium hydroxide and neutralizing the salt thus obtained.
(2) By converting compound Va with silver oxide to compound V, which is converted to compound VIII as discussed above.
(3) By converting compound Va with hydroxylamine at about 25 to 78° C., during 2 to 10 hours, into 4-(2-benzoylphenyl)-5-substituted-4H-1,2,4-triazole-3-carboxaldehyde-3-oxime (VIa); hydrogenating catalytically (e.g. with a platinum catalyst) VIa to give 5,6-dihydro-1-substituted - 6 - phenyl-4H-s-triazol[4,3-a][1,4]benzodiazepine (VIIa) which by oxidation with manganese dioxide, or preferably dimethyl azodicarboxylate in benzene, toluene, tetrahydrofuran or the like at 25 to 100° C. for 1–5 hours gives product VIII.

The following examples are illustrative of the processes and products of the present invention, but are not to be construed as limiting.

PREPARATION 1

2'-benzoyl-4'-chloroacetanilide

Acetyl chloride (81.3 g., 1.037 mole) was added to a stirred solution of 2-amino-5-chlorobenzophenone (200.0 g., 0.864 mole) and pyridine (68.4 g., 0.864 mole) in dry ether (4 l.); the mixture was kept at ambient temperature for 2 hours and treated with 500 ml. of water. The layers were separated and the ether layer was dried over anhydrous sodium sulfate and concentrated. Crystallization of the residue from ethyl acetate-Skellysolve B hexanes gave: 124.0 g. of 2'-benzoyl-4'-chloroacetanilide of melting point 114–115° C. Two more crops of 2'-benzoyl-4'-chloroacetanilide also were obtained: 67.8 g. of melting point 113.5–114.5° C. and 33.0 g. of melting point 113–114° C.

PREPARATION 2

6-chloro-4-phenyl-2(1H)-quinoline

The procedure (reaction of 2'-benzyol-5'-chloroacetanilide with sodium hydroxide) of A. E. Drukker and C. I. Judd, J. Heterocyclic Chem. 3, 359 (1966) was used for this preparation. The yield was 77%. Two other preparations have been described: S. C. Bell, T. S. Sulkowski, C. Gochman and S. J. Childress, J. Org. Chem. 27, 562 (1962); G. A. Reynolds and C. R. Hauser, J. Amer. Chem. Soc. 72, 1852 (1950).

PREPARATION 3

2,6-dichloro-4-phenylquinoline

The procedure of A. E. Drukker and C. I. Judd, J. Heterocyclic Chem. 3, 359 (1955) was used for this preparation. The yield was 62%.

EXAMPLE 1

6-chloro-2-hydrazino-4-phenylquinoline

A stirred mixture of 2,6-dichloro-4-phenylquinoline (2.7 g., 0.01 mole) and hydrazine hydrate (6.8 g.) was refluxed under nitrogen for 1 hour and concentrated in vacuo. The residue was suspended in warm water, and the solid was collected by filtration, dried and recrystallized from ethyl acetate-Skelly B hexanes to give 1.81 g. (67% yield) of 6-chloro-2-hydrazino-4-phenylquinoline of melting point 156.5–157° C.

*Analysis.*—Calcd. for $C_{15}H_{12}ClN_3$ (percent): C, 66.79; H, 4.49; Cl, 13.15; N, 15.58. Found (percent): C, 67.15; H, 4.65; Cl, 13.19; N, 15.32.

EXAMPLE 2

7-chloro-1-methyl-5-phenyl-s-trizolo[4,3-a]quinoline

A stirred mixture of 6-chloro-2-hydrazino-4-phenylquinoline (1.4 g., 0.0052 mole), triethyl orthoacetate (0.925 g., 0.0057 mole) and xylene (100 ml.) was refluxed, under nitrogen, for 2 hours 40 minutes. During this period the ethanol formed in the reaction was removed by distillation through a short, glass helix-packed column. The mixture was concentrated to dryness in vacuo and the residue was crystallized from methanol-ethyl acetate to give: 1.02 g. of 7-chloro-1-methyl-5-phenyl-s-triazolo[4,3-a]quinoline of melting point 253.5–255° C. and 0.26 g. of melting point 253.5–255° C. (83.9% yield). The analytical sample was crystallized from methylene chloride:methanol and had a melting point 252.5–253.5° C.

*Analysis.*—Calcd. for $C_{17}H_{12}ClN_3$ (percent): C, 69.50; H, 4.12; Cl, 12.07; N, 14.31. Found (percent): C, 69.39; H, 4.02; Cl, 12.10; N, 14.49.

EXAMPLE 3

5-chloro - 2 - (3-methyl-4H-1,2,4-triazol-4-yl)benzophenone (Oxidation of 7-chloro-1-methyl-5-phenyl-s-triazolo[4,3-a]quinoline)

A stirred suspension of 7-chloro-1-methyl-5-phenyl-s-triazolo[4,3-a]quinoline (2.94 g., 0.01 mole) in acetone (110 ml.) was cooled in an ice-bath and treated slowly with a solution prepared by adding sodium periodate (2 g.) to a stirred suspension of ruthenium dioxide (200 mg.) in water (35 ml.). The mixture became dark. Additional sodium periodate (8 g.) was added during the next 15 minutes. The ice bath was removed and the mixture was stirred for 45 minutes. Additional sodium periodate (4 g.) was added and the mixture was stirred at ambient temperature for 18 hours and filtered. The solid was washed with acetone and the combined filtrate was concentrated in vacuo. The residue was suspended in water and extracted with methylene chloride. The extract was dried over anhydrous potassium carbonate and concentrated. The residue was chromatographed on silica gel (100 g.) with 10% of methanol 90% ethyl acetate; 50 ml. fractions were collected. The product was eluted in fractions 10–20 and was crystallized from ethyl acetate to give: 0.405 g. of melting point 168–169.5° C. and 0.291 g. of melting point 167.5–169° (23.4% yield) of 5-chloro-2-(3-methyl-4H-1,2,4-triazol-4-yl)benzophenone. The analytical sample had a meting point of 168° C.

*Analysis.*—Calcd. for $C_{16}H_{12}ClN_3O$ (percent): C, 64.54; H, 4.06; Cl, 11.91; N, 14.11. Found (percent): C, 64.56; H, 4.35; Cl, 11.97, 11.93; N, 14.29.

EXAMPLE 4

Oxidation of 7-chloro-1-methyl-5-phenyl-s-triazolo[4,3-a]quinoline

A stirred suspension of 7-cholro-1-methyl-5-phenyl-s-triazolo[4,3-a]quinoline (2.94 g., 0.01 mole) and acetone (200 ml.) was cooled in an ice bath and treated, dropwise, during 15 minutes with a solution prepared from ruthenium dioxide (200 mg.), sodium periodate (4 g.) and water (35 ml.). A slight exothermic reaction was noted and the mixture became dark. After 10 minutes 29 ml. of a solution of sodium periodate (12 g.) in water (70 ml.) was added during 10 minutes. This mixture was stirred for 2 hours and then the remaining sodium periodate solution (41 ml.) was addded during the next 3 hours. The mixture was concentrated in vacuo to remove acetone. The resulting aqueous mixture was extracted with methylene chloride. The extract was washed with water, dried over anhydrous magnesium sulfate, and concentrated. The residue was chromatographed on silica gel (150 g.) with 2% methanol-98% chloroform; 60 ml. fractions were collected. Recovered starting material was eluted in fractions 11–14 and crystallized from methanol-methylene chloride to give 0.069 g. of melting point 251.5–253.5° C. A mixture of the two products were eluted in fractions 15–39. Crystallization of this mixture from ethyl acetate gave 618 mg. (20.8%) of 5-chloro-2-(3-methyl-4H-1,2,4-triazolo-4-yl)benzophenone of melting point 165.5–168°. Crystallization of the mother liquor from methanol gave 0.126 g., melting point 108–112 and 0.588 g. of melting point 101.5–105.5° (decomposition) (19.9% yield) of a methanol solvate of 4-(2-benzoyl-4-chlorophenyl)-5-methyl-4H-1,2,4-triazole-3-carboxaldehyde. The analytical sample had a melting point 100–101.5° C.

*Analysis.*—Calcd. for $C_{17}H_{12}ClN_3O_2$ (percent): C, 62.68; H, 3.71; Cl, 10.89; N, 12.90. Found (percent): C, 59.37; H, 4.89; Cl, 9.75; N, 11.30.

MeOH, 9.34%; $H_2O$, 0.40%. Corrected for MeOH and $H_2O$: C, 61.90; H, 4.06; Cl, 10.80; N, 12.52.

Heating the solvate in a desiccator at 70° C. and at 15 mm. Hg for 72 hours gave pure 4-(2-benzoyl-4-chlorophenyl)-5-methyl-4H-1,2,4-triazole-3-carboxaldehyde.

EXAMPLE 5

Oxidation of 7-chloro-1-methyl-5-phenyl-s-triazolo[4,3-a]quinoline

A vigorous stream of ozone in oxygen was bubbled for 12 hours, into a stirred, ice-cold solution of 7-chloro-1-methyl-5-phenyl-s-triazolo[4,3-a]quinoline (31.1 g., 0.106 mole) in methanol (750 ml.) and methylene chloride (500 ml.). The resulting mixture was filtered and the filtrate was added to an ice cold solution of sodium iodide (47.5 g.) and acetic acid (63 ml.) in water (200 ml.). The solution was decolorized by the addition of sodium thiosulfate and concentrated in vacuo. The residue was mixed with water and extracted with methylene chloride. The extract was washed ($H_2O$), dried over anhydrous magnesium sulfate and concentrated. The residue was chromatographed on silica gel (1.5 kg.); 175 ml. fractions were collected. Fractions 1–128 were eluted with 1% methanol-99% chloroform and fractions 129–168 with 5% methanol-95% chloroform. The first compound was eluted in fractions 49–60 and crystallized from methanol-ethyl acetate to give: 0.769 g. of melting point 229.5–231° (decomposition) and 0.535 g. of melting point 228° (decomposition) of 7-chloro-1-methyl-5-phenyl-s-triazolo[4,3-a]quinolin-4(5H)-one. The analytical sample had a melting point 232–233° C.

*Analysis.*—Calcd. for $C_{17}H_{12}ClN_3O$ (percent): C, 65.92; H, 3.91; Cl, 11.44; N, 13.57. Found (percent): C, 65.46; H, 3.72; Cl, 11.48; N, 13.59.

Recovered starting material was eluted in fractions 66–78 and crystallized from methylene chloride-methanol to give 0.737 g. of melting point 251–253.5° C. A mixture of the two remaining products was eluted in fractions 73–168. Crystallization of this mixture from ethyl acetate gave: 10.8 g. of melting point 166.5–167.5° C., 0.987 g. of melting point 166–167° C. and 2.52 g. of melting point 164–165.5° C. (45.3% yield) of 5-chloro-2-(3 - methyl-4H-1,2,4-triazol-4-yl)benzophenone. Crystallization of the mother liquor from methanol gave 5.62 g. of melting point 140–141.5° C., 1.23 g. of melting point 100.5–102.5° (decomposition) and 1.04 g. of melting point 105–137.5° (20.8% yield) of 4-(2-benzoyl-4-chlorophenyl)-5-methyl-4H-1,2,4-triazole-3-carboxaldehyde.

EXAMPLE 6

5-chloro-2-[3-(hydroxymethyl)-5-methyl-4H-1,2,4-triazol-4-yl]benzophenone

A stirred mixture of 5-chloro-2-(3-methyl-4H-1,2,4-triazolo-4-yl)benzophenone, (2.98 g., 0.01 mole) paraformaldehyde (3 g.) and xylene (100 ml.) was warmed under nitrogen, in a bath maintained at 125° C. for 7 hours. The mixture was then concentrated in vacuo. The residue was chromatographed on silica gel (150 g.) with 3% methanol-97% chloroform. Fifty ml. fractions were collected. The product was eluted in fractions 20–44. The fractions were concentrated and the residue was crystallized from ethanol-ethyl acetate to give: 1.64 g. of melting point 138–142° C.; 0.316 g. of melting point 138.5–141° C.; 0.431 g. of melting point 139–141° C. (72.8% yield) of 5-chloro-2-[3-(hydroxymethyl)-5-methyl-4H-1,2,4-triazol-4-yl]benzophenone. The analytical sample had a melting point of 138–139° C.

*Analysis.*—Calcd. for $C_{17}H_{14}ClN_3O_2$ (percent): C, 62.30; H, 4.30; Cl, 10.81; N, 12.82. Found (percent): C, 62,23; H, 4.22; Cl, 10.82; N, 11.73.

EXAMPLE 7

5-chloro-2-[3-(bromomethyl)-5-methyl-4H-1,2,4-triazol-4-yl]benzophenone

A solution of 5-chloro-2-[3-(hydroxymethyl)-5-methyl-4H-1,2,4-triazol-4-yl]benzophenone (328 mg., 0.001 mole) in dry, hydrocarbon-stabilized chloroform (5 ml.) was cooled in an ice bath and treated with phosphorus tribromide (0.1 ml.). The colorless solution was kept in the ice bath for 55 minutes, at ambient temperature (22–24° C.), for 5 hours. The resulting yellow solution was poured into a mixture of ice and dilute sodium bicarbonate. This mixture was extracted with chloroform. The extract was washed with brine, dried over anhydrous magnesium sulfate and concentrated. The residue was crystallized from methylene chloride-ethyl acetate to give: 0.285 g. of melting point 200–240° (decomposition) and 0.030 g. of melting point 200–220° C. (decomposition) of 5-chloro-2-[3 - (bromomethyl)-5-methyl-4H-1,2,4-triazol-4-yl]benzophenone. The analytical sample had a melting point of 200–240° C.

*Analysis.*—Calcd. for $C_{17}H_{13}BrClN_3O$ (percent): C, 52.26; H, 3.35; Br, 20.46; Cl, 9.08; N, 10.76. Found (percent): C, 52.13; 52.45; H, 3.77; 3,66; Br, 20.44; Cl, 9.20; N, 10.43.

EXAMPLE 8

5-chloro-2-[3-(chloromethyl)-5-methyl-4H-1,2,4-triazol-4-yl]benzophenone

A solution of 5-chloro-2-[3-(hydroxymethyl)-5-methyl-4H - 1,2,4 - triazol - 4 - yl]benzophenone (328 mg., 0.001 mole) in thionyl chloride (2 ml.) was warmed during 40 min. to a bath temperature of 78° C. and kept at 78–83° C. for 1 hour 25 minutes. It was then cooled and poured into ice water. This mixture was neutralized with sodium bicarbonate and extracted with chloroform. The extract was washed with brine, dried over anhydrous magnesium sulfate and concentrated in vacuo. The residue was crystallized from ethyl acetate Skellysolve B hexanes to give: 0.240 g. of melting point 144.5–147° C. and 0.045 g. of melting point 144.5–146.5° C. of 5-chloro-2-[3 - (chloromethyl)-5-methyl - 4H-1,2,4 - triazol-4-yl] benzophenone. The analytical sample had a melting point of 139–140° C.

*Analysis.*—Calcd. for $C_{17}H_{13}Cl_2N_3O$ (percent): C, 58.96; H, 3.78; Cl, 20.48; N, 12.14. Found (percent): C, 59.22; H, 3.80; Cl, 20.66; N, 11.91.

EXAMPLE 9

5-chloro-2-[3-(iodomethyl)-5-methyl-4H-1,2,4-triazol-4-yl]benzophenone

5 - chloro-2-[3-(chloromethyl) - 5 - methyl-4H-1,2-triazol-4-yl]benzophenone (346 mg. 0.001 mole) was added to a stirred solution of sodium iodide (300 mg., 0.002 mole) in acetone, and the resulting mixture was stirred at ambient temperature for 6 hours 54 minutes and poured into ice water. This mixture was extracted with chloroform. The extract was washed with brine, dried and concentrated. The residue was crystallized from methylene chloride-ethyl acetate to give: 0.227 g. of melting point 185.5–192° (decomposition) of 5-chloro-2-[3-(iodomethyl)-5-methyl-4H-1,2,4-triazol - 4 - yl]benzophenone. The analytical sample had a melting point of 185–200° C. (decomposition).

*Analysis.*—Calcd. for $C_{17}H_{13}ClIN_3O$ (eprcent): C, 46.65; H, 2.99; Cl, 8.10; I, 29.00; N, 9.60. Found (percent): C, 46.78; H, 2.88; Cl, 8.59; I, 26.98; N, 9.23.

EXAMPLE 10

8-chloro-1-methyl-6-phenyl-4H-s-triazolo-[4,3-a][1,4]benzodiazepine

A stirred suspension of 5-chloro-2-[3-(bromomethyl) 5-methyl-4H-1,2,4-triazol-4-yl]benzophenone (391 mg., 0.001 mole) in tetrahydrofuran (15 ml.) was cooled in an ice bath and treated with a saturated solution of ammonia in methanol (12.5 ml.). The resulting solution was allowed to warm to ambient temperature and stand for 24 hours. It was then concentrated in vacuo. The residue was suspended in water, treated with a little sodium bicarbonate and extracted with methylene chloride. The extract was washed with brine, dried with anhydrous potassium carbonate and concentrated. The residue was crystallized from methylene chloride-ethyl acetate to give 0.220 g. of crude product of melting point 227–228.5° C. 0.053 g. Recrystallization of this material from ethyl acetate gave 0.142 g. of melting point 228–229.5° of melting point 228.5–229.5° C. and 0.021 g. of melting point 228–229.5° C. of 8-chloro-1-methyl-6-phenyl-4H-s-triazolo-[4.3-a][1,4]benzodiazepine.

Reaction of the 5-chloro-2-[3-(chloromethyl)-5-methyl-4H-1,2,4-triazol-4-yl]benzophenone with ammonia in methanol also gave 8-chloro-1-methyl-6-phenyl-4H-s-triazolo[4,3-a][1,4]benzodiazepine, but the reaction was slower. It required more than 2 days to go to completion.

In like manner, 782 mg. (0.002 mole) of 5-chloro-2-[3-(bromomethyl) - 5 - methyl-4H-1,2,4-triazol-4-yl]benzophenone in methylene chloride cooled in a Dry Ice-methanol bath gave with anhydrous ammonia 515 mg. of 8-chloro-1-methyl - 6 - phenyl-4H-s-triazolo[4,3-a][1,4] benzodiazepine of melting point 226–227° C.

In the manner given in Example 10 but using a substituted amine in place of ammonia, e.g. lower monoalkylamines such as methylamine ethylamine, propylamine, isopropylamine, butylamine; lower dialkylamines, such as dimethylamine, diethylamine, dipropylamines, dibutylamines; mixed amines such as methyl ethylamine, ethylpropylamine, heterocyclic amines, e.g. pyrrolidine, piperidine, morpholine, hexamethyleneimine, piperazine or alkyl-substituted heterocyclic compounds, e.g. 2-methylpiperidine and the like, gives 2-[3-(substituted aminomethyl) - 5 - substituted-4H-1,2,4-triazol-4-yl]benzophenones of the formula:

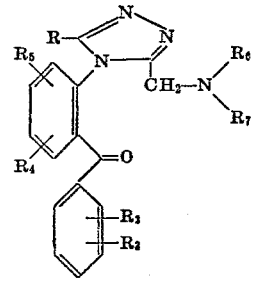

XI wherein R, $R_2$, $R_3$, $R_4$, and $R_5$ have the significance of above and wherein $R_6$ and $R_7$ are selected from the group consisting of hydrogen and alkyl of 1 to 5 carbon atoms, inclusive, with the proviso that only one parameter $R_6$ and $R_7$ can be hydrogen, or together

is a heterocyclic amine, e.g. pyrrolidine, piperidine, morpholino, or hexamethyleneimino which can be further substituted with alkyl groups.

Compounds of Formula XI are sedatives and tranquilizers at low dosages in mammals.

In the Nicotine Antagonism test, as described previously, the following three compounds prevented tonic extensor fits and death at dosage levels of less than 1 mg. per kg. in mice.

5 - chloro-2-[[3-[(methylamino)methyl]-5-methyl-4H-1,2,4-triazol-4-yl]]benzophenone, prepared in a nitrogen atmosphere from 2-[3-bromomethyl-5-methyl-4H-1,2,4-triazol-4-yl]benzophenone in methanol and tetrahydrofuran and monomethylamine, had a melting point of 174–175° C.

5-chloro-2-[[3-[(dimethylamino)methyl] - 5 - methyl-4H-1,2,4-triazol-4-yl]]benzophenone was made in similar manner with dimethylamine. Melting point 171 to 172° C.

5 - chloro-2-[[3-[(diethylamino)methyl] - 5 - methyl-4H-1,2,4-triazol-4-yl]]benzophenone had a melting point of 110.5–111.5° C.

EXAMPLE 11

8-chloro-1-methyl-6-phenyl-4H-s-triazolo[4,3-a][1,4]benzodiazepine-4-carboxylic acid ethyl ester A stirred mixture of 8-chloro-1-methyl-6-phenyl-4H-s-triazolo[,3-a][1,4]benzodiazepine (61.8 g., 0.20 mole) and diethyl carbonate (1 liter) was treated successively with sodium hydride (8.43 g. of a 57% suspension in mineral oil) and ethanol (2 ml.). It was then refluxed under nitrogen for 1.5 hour, cooled and concentrated in vacuo. The residue was treated with 1 liter of ice water which contained 0.2 mole of hydrochloric acid and extracted with methylene chloride. The extract was dried over anhydrous potassium carbonate and concentrated. The residual solid was boiled with ethyl acetate and collected by filtration. It was recrystallized from methylene chloride-ethanol to give 35.7 g. of 8-chloro-1-methyl-6-phenyl-4H - s - triazolo[4,3-a][1,4]benzodiazepine-4-carboxylic acid ethyl ester of melting point 224–225° C. (decomposition) and 6.98 g. of melting point 210–214° C. (decomposition). The analytical sample had a melting point of 223–224° C. (decomposition).

*Analysis.*—Calcd. for $C_{20}H_{17}ClN_4O_2$ (percent): C, 63.07; H, 4.50; Cl, 9.31; N, 14.71. Found (percent): C, 62.83; H, 4.61; Cl, 9.30; N, 14.71.

EXAMPLE 12

8-chloro-1,4-dimethyl-6-phenyl-4H-s-triazolo-[4,3-a][1,4]benzodiazepine-4-carboxylic acid ethyl ester An ice cold stirred solution of 8-chloro-1-methyl-6-phenyl-4H - s-triazolo[4,3-a][1,4]benzodiazepine-4-carboxylic acid ethyl ester (3.81 g., 0.01 mole) in dimethylformamide (50 ml.) was treated with sodium hydride (0.462 g., 0.011 mole of a 57% mineral oil suspension) and kept in the ice bath for 15 minutes and at ambient temperature for 1 hour 50 minutes. It was then cooled in an ice bath, treated with methyl iodide (1.56 g., 0.011 mole), and kept at ambient temperature for 2 hours 15 minutes, at 100–105° C. for 2 hours and at ambient temperature for 18 hours. This mixture was concentrated in vacuo. The residue was mixed with water, neutralized with acetic acid and extracted with methylene chloride. The extract was dried over anhydrous sodium carbonate and concentrated. The residue was crystallized from ethyl acetate-Skellysolve B hexanes to give 2.86 g. (72.4%) of 8-chloro-1,4-dimethyl-6-phenyl - 4H-s-triazolo[4,3-a][1.4]benzodiazepine-4-carboxylic acid ethyl ester of melting point 185°. The analytical sample had a melting point of 175.5–176.5° C.

*Analysis.*—Calcd. for $C_{21}H_{19}ClN_4O_2$ (percent): C, 63.97; H, 4.85; Cl, 8.98; N, 14.19. Found (percent): C, 64.21; H, 5.01; Cl, 8.97; N, 14.19.

EXAMPLE 13

8-chloro-1,4-dimethyl-6-phenyl-4H-s-triazolo[4,3-a][1,4]benzodiazepine

A solution of 8-chloro-1,4-dimethyl-6-phenyl-4H-s-triazolo[4,3-a][1,4]benzodiazepine-4-carboxylic acid ethyl ester (4.47 g., 0.0113 mole) in 95% ethanol (140 ml.) was treated with 1 N sodium hydroxide (33.9 ml.), refluxed, under nitrogen for 5 hours and concentrated in vacuo. A solution of the residue in brine was neutralized with hydrochloric acid and extracted with chloroform. The extract was dried over anhydrous potassium carbonate and concentrated in vacuo. The residue was crystallized from Skellysolve B hexanes to give 2.31 g. of 8-chloro-1,4-dimethyl - 6 - phenyl-4H-s-triazolo[4,3-a] [1,4]benzodiazepine of melting point 197–198.5° C. The analytical sample had a melting point 119–200.5° C.

*Analysis.*—Calcd. for $C_{18}H_{15}ClN_4$ (percent): C, 66.97; H, 4.68; Cl, 10.99; N, 17.36. Found (percent): C, 66.44; 66.42; H, 4.96; 4.82; Cl, 10.69; N, 17.06; 16.85.

EXAMPLE 14

Saponification of 8-chloro - 1 - methyl-6-phenyl-4H-s-triazolo[4,3-a][1,4]benzodiazepine - 4 - carboxylic acid ethyl ester A stirred suspension of 8-chloro-1-methyl-6-phenyl-4H-s-triazolo[4,3-a][1,4]benzodiazepine - 4-carboxylic acid ethyl ester (3.81 g., 0.01 mole) in ethanol (100 ml.) was treated with 10 ml. of 1 N sodium hydroxide. A transient red color developed, and the solid slowly went into solution. The mixture was kept at ambient temperature for 3 hours 15 minutes and concentrated in vacuo. The residue was dissolved in a mixture of absolute ethanol and benzene and concentrated to give 4.18 g. of a solid of melting point 91.5° C. (decomposition). This material was soluble in benzene, but an attempt to recrystallize it from benzene for analysis gave 8-chloro-1-methyl - 4H-s - triazolo[4,3-a][1,4]benzodiazepine of melting point 227–227.5° C.

A 1 g. sample of the solid was dissolved in cold water and stirred for a few minutes. The solid which precipitated was collected by filtration, washed with water and dried to give 0.234 g. of material of melting point 225–227.5° C. Recrystallization of this material from methylene chloride-ethyl acetate gave 0.133 g. of 8-chloro-1-methyl-6-phenyl-4H - s - triazolo[4,3-a][1,4]benzodiazepin of melting point 229–230°.

The aqueous filtrate from the above solid was cooled in an ice bath and acidified (pH 3) with hydrochloric acid. The precipitate was collected by filtration, washed with water and dried to give 0.078 g. This material softened at about 120°, decomposed with bubbling at 140°, resolidified and melted at 213–223°. It was recrystallized from methylene chloride-ethyl acetate to give 0.032 g. of 8-chloro-1-methyl-6-phenyl - 4H-s-triazolo[4,3-a][1,4]benzodiazepine of melting point 228–229° C.

EXAMPLE 15

5-chloro-2-(3-methyl-4H-1,2,4-triazol-4-yl)benzophenone

A stirred solution of silver nitrate (0.357 g., 0.0021 mole) in water (1.8 ml.) was treated with 1 N sodium hydroxide (4.1 ml.). To the resulting stirred suspension of silver oxide was added a warm solution of 4-(2-benzoyl-4-chlorophenyl)-5 methyl-4H - 1,2,4-triazole-3-carboxaldehyde methanol solvate (326 mg.) in methanol (15 ml.), and the resulting mixture was stirred under nitrogen at ambient temperautre for 18 hours. The solid was collected by filtration and washed with water and methanol. The filtrate was concentrated in vacuo to remove methanol and the resulting aqueous solution was cooled in an ice bath, neutralized with hydrochloric acid and extracted with chloroform. The residue was crystallized from ethyl acetate to give 0.162 g. of 5-chloro-2-(3-methyl-4H-1,2,4-triazolo - 4-yl)benzophenone of melting point 169.5–171° C.

EXAMPLE 16

4-(2-benzoyl-4-chlorophenyl)-5-methyl-4H-1,2,4-triazole-3-carboxaldehyde 3-oxime A stirred mixture of 4-(2-benzoyl-4-chlorophenyl)-5-methyl-4H-1,2,4-triazole-3-carboxaldehyde (3.26 g.), hydroxylamine hydrochloride (0.765 g., 0.011 mole), sodium acetate (0.903 g., 0.011 mole), ethanol (50 ml.) and water (12.5 ml.) was refluxed, under nitrogen for 4.5 hours. (The product precipitated from the initially clear solution during the reflux period.) The cooled mixture was poured into cold water, and the solid was collected by filtration, washed with water and dried to give 2.7 g. of crude 4-(2-benzoyl-4-chlorophenyl)-5-methyl-4H-1,2,4-triazole-3-carboxaldehyde. Crystallization of this material from methylene chloride-methanol gave: 2.03 g., of melting point 280–281° C. (decomposition); 0.325 g. of melting point 278.5–279.5° C. (decomposition) and 0.154 g. of melting point 276–277° C. (decomposition) of 4-(2-benzoyl-4-chlorophenyl)-5 - methyl-4H-1,2,4-triazole-3-carboxaldehyde 3-oxime. The analytical sample had a melting point 283.5–284° (decomposition).

Analysis.—Calcd. for $C_{17}H_{13}ClN_4O_2$ (percent): C, 59.92; H, 3.84; Cl, 10.41; N, 16.44. Found (percent): C, 60.20; H, 4.22; Cl, 9.92; N, 16.78.

EXAMPLE 17

8-chloro-5,6-dihydro-1-methyl-6-phenyl-4H-s-triazolo [4,3-a][1,4]benzodiazepine

A mixture of 4-(2-benzoyl-4-chlorophenyl)-5-methyl-4H-1,2,4-triazole-3-carboxaldehyde 3-oxime (0.500 g.), platinum oxide (0.2 g.) and acetic acid (50 ml.) was hydrogenated in a Parr apparatus at an initial pressure of 32 lbs./sq. in. for 8 hours 52 minutes. It was then filtered through Celite diatomaceous earth and the filtrate was concentrated in vacuo. A mixture of the residue and warm water was decolorized with Darco G 60 activated charcoal, cooled in an ice bath, made alkaline with sodium hydroxide and extracted with chloroform. The extract was washed with brine, dried over anhydrous potassium carbonate and concentrated. A solution of the residue in ethyl acetate was acidified with ethereal hydrochloric acid. The solid, which precipitated, was collected by filtration, washed with ethyl acetate and recrystallized from ethanol-ethyl acetate. This salt was converted back to the free base by suspending it in dilute sodium bicarbonate and extracting it with chloroform. The extract was washed (brine), dried over anhydrous potassium carbonate and concentrated; the residue was crystallized from methanol-ethyl acetate to give 31 mg. of 8-chloro-5,6-dihydro-1-methyl-6-phenyl-4H-s-triazolo[4,3-a][1,4]benzodiazepine.

EXAMPLE 18

8-chloro-1-methyl-6-phenyl-4H-s-triazolo[4,3-a][1,4] benzodiazepine

A stirred mixture of 8-chloro-5,6-dihydro-1-methyl-6-phenyl - 4H - s - triazolo[4,3-a][1,4]benzodiazepine (311 mg., 0.001 mole), diethyl azo-dicarboxylate (350 mg., 0.002 mole) and dry benzene (10 ml.) was refluxed, under nitrogen for 2 hours 45 minutes, allowed to stand at ambient temperature for 18 hours and concentrated in vacuo. The semi-crystalline residue was washed with ether and the resulting solid was crystallized from ethyl acetate to give two crops: 0.123 g. of melting point 228.5–230° C. and 0.053 g. of melting point 223–226° C. of 8-chloro-1-methyl - 6 - phenyl-4H-s-triazolo[4,3-a][1,4]benzodiazepine. The mixed melting point of the first crop with an authentic sample was undepressed; it was identical to the authentic sample.

EXAMPLE 19

6-chloro-4-(2,6-difluorophenyl)-2-hydrazinoquinoline

In the manner given in Example 1, 2,6-dichloro-4-(2,6-difluorophenyl)quinoline was reacted at reflux with hydrazine hydrate to give 6-chloro-4-(2,6-difluorophenyl)-2-hydrazinoquinoline.

EXAMPLE 20

7-chloro-1-methyl-5-(2,6-difluorophenyl)-s-triazolo [4,3-a]quinoline

In the manner given in Example 2, 6-chloro-4-(2,6-difluorophenyl)-2-hydrazineoquinoline and triethyl orthoacetate are refluxed in xylene to give 7-chloro-1-methyl-5-(2,6-difluorophenyl)-s-triazolo[4,3-a]quinoline.

EXAMPLE 21

5-chloro-2′,6′-difluoro-2-(3-methyl-4H-1,2,4-triazol-4-yl)benzophenone

In the manner given in Example 3, 7-chloro-1-methyl-5-(2,6-difluorophenyl)-s-triazolo[4,3-a]quinoline was oxidized at low temperature with sodium periodate and ruthenium dioxide to give 5-chloro-2′,6′-difluoro-2-(3-methyl-4H-1,2,4-triazol-4-yl)benzophenone.

EXAMPLE 22

5-chloro-2′,6′-difluoro-2-[3-(hydroxymethyl)-5-methyl-4H-1,2,4-triazol-4-yl]benzophenone In the manner given in Example 6, 5-chloro-2′,6′-difluoro - 2 - (3-methyl-4H-1,2,4-triazol-4-yl)benzophenone was heated with paraformaldehyde at 125° C. to give 5 - chloro - 2′,6′ - difluoro - 2 - [3 - (hydroxymethyl) - 5-methy-4H-1,2,4-triazol-4-yl]benzophenone.

EXAMPLE 23

5-chloro-2′,6′-difluoro-2-[3-(bromomethyl)-5-methyl-4H-1,2,4-triazol-4-yl]benzophenone In the manner given in Example 7, 5-chloro-2′,6′-difluoro - 2 - [3-(hydroxymethyl) - 5 - methyl-4H-1,2,4-triazol-4-yl]benzophenone was treated with phosphorus tribromide to give 5-chloro-2′,6′-difluoro-2-[3-(bromomethyl)-5-methyl-4H-1,2,4-triazol-4-yl]benzophenone.

EXAMPLE 24

8-chloro-1-methyl-6-(2,6-difluorophenyl)-4H-s-triazolo [4,3-a][1,4]benzodiazepine In the manner given in Example 10, 5-chloro-2′,6′-difluoro - 2-[3-(bromomethyl)-5-methyl-4H-1,2,4-triazol-4-yl]benzophenone was reacted with a saturated solution of ammonia in methanol to give 8-chloro-1-methyl-6-(2,6-difluorophenyl) - 4H - s - triazolo[4,3-a][1,4]benzodiazepine.

EXAMPLE 25

6-chloro-4-(o-chlorophenyl)-2-hydrazinoquinoline

In the manner given in Example 1, 2,6-dichloro-4-(o-chlorophenyl)quinoline was reacted at reflux with hydrazine hydrate to give 6-chloro-4-(o-chlorophenyl)-2-hydrazinoquinoline.

EXAMPLE 26

7-chloro-1-methyl-5-(o-chlorophenyl)-s-triazolo [4,3-a]quinoline

In the manner given in Example 2, 6-chloro-4-(o-chlorophenyl)-2-hydrazineoquinoline and triethyl orthoacetate were refluxed in xylene to give 7-chloro-1-methyl-5-(o-chlorophenyl)-s-triazolo[4,3-a]quinoline.

EXAMPLE 27

2′,5-dichloro-2-[3-methyl-4H-1,2,4-triazol-4-yl] benzophenone

In the manner given in Example 3, 7-chloro-1-methyl-5-(o-chlorophenyl)-s-triazolo[4,3-a]quinoline was oxidized at low temperature with sodium periodate with ruthenium dioxide to give 2′,5-dichloro-2-(3-methyl-4H-1,2,4-triazol-4-yl)benzophenone.

EXAMPLE 28

2′,5-dichloro-2-[3-(hydroxymethyl)-5-methyl-4H-1,2,4-triazol-4-yl]benzophenone

In the manner given in Example 6, 2′,5-dichloro-2-(3-methyl-4H-1,2,4-triazolo-4-yl)benzophenone was heated with paraformaldehyde at 125° C. to give 2′,5-dichloro-2-[3 - (hydroxymethyl) - 5 - methyl-4H-1,2,4-triazol-4-yl] benzophenone.

EXAMPLE 29

2′,5-dichloro-2-[3-(bromomethyl)-5-methyl-4H-1,2,4-triazol-4-yl]benzophenone

In the manner given in Example 7, 2′,5-dichloro-2-[3-hydroxymethyl) - 5 - methyl - 4H - 1,2,4-triazol - 4 - yl] benzophenone) was treated with phosphorus tribromide to give 2′,5-dichloro-2-[3-(bromomethyl) - 5 - methyl-4H - 1,2,4 -triazol-4-yl]benzophenone).

EXAMPLE 30

8-chloro-1-methyl-6-(o-chlorophenyl)-4H-s-triazole [4,3-a][1,4]benzodiazepine

In the manner given in Example 10, 2′,5-dichloro-2-[3-(bromomethyl)-5-methyl - 4H - 1,2,4 - triazol - 4 - yl] benzophenone was reacted with a saturated solution of ammonia in methanol to give 8-chloro-1-methyl-6-(o-chlorophenyl)-4H-s-triazolo[4,3-a][1,4]benzodiazepine.

EXAMPLE 31

5-nitro-6-propyl-4-(m-trifluoromethylphenyl)-2-hydrazinoquinoline

In the manner given in Example 1, 2-chloro-5-nitro-6-propyl-4-(m-trifluoromethylphenyl)quinoline was reacted at reflux with hydrazine hydrate to give 5-nitro-6-propyl-4-(m-trifluoromethylphenyl)-2-hydrazinoquinoline.

EXAMPLE 32

6-nitro-7-propyl-1-ethyl-5-(m-trifluoromethylphenyl)-s-triazolo[4,3-a]quinoline

In the manner given in Example 2, 5-nitro-6-propyl-4-(m-trifluoromethylphenyl)-2- hydrazinoquinoline, and triethyl orthopropionate were refluxed in xylene to give 6-nitro-7-propyl - 1 - ethyl - 5 - (m-trifluoromethylphenyl)-s-triazolo[4,3-a]quinoline.

EXAMPLE 33

6-nitro-5-propyl-2-(3-ethyl-4H-1,2,4-triazol-4-yl)-3′-(trifluoromethyl)benzophenone In the manner given in Example 3, 6-nitro-7-propyl-1-ethyl - 5 - (m - trifluoromethylphenyl)-s-triazolo[4,3-a] quinoline was oxidized at low temperature with sodium periodate with ruthenium dioxide to give 6-nitro-5-propyl-2-(3-ethyl-4H-1,2,4-triazol - 4 - yl) - 3 - (trifluoromethyl)benzophenone.

EXAMPLE 34

6-nitro-5-propyl-2-[3-(hydroxymethyl)-5-ethyl-4H-1,2,4-triazol-4-yl]-3-(trifluoromethyl)benzophenone In the manner given in Example 6, 6-nitro-5-propyl-2-(3-ethyl-4H-1,2,4-triazol - 4 - yl) - 3 - (trifluoromethyl) benzophenone was heated with paraformaldehyde at 125° C. to given 6-nitro-5-propyl-2-[3-(hydroxymethyl)-5-ethyl-4H-1,2,4-triazol - 4- yl] - 3 - (trifluoromethyl)benzophenone.

EXAMPLE 35

6-nitro-5-propyl-2-[3-(bromomethyl)-5-ethyl-4H-1,2,4-triazol-4-yl]-3-(trifluoromethyl)benzophenone In the manner given in Example 7, 6-nitro-5-propyl-2-[3-(hydroxymethyl) - 5 - ethyl - 4H - 1,2,4 - triazol-4-yl]-3-(trifluoromethyl)benzophenone was treated with phosphorus tribromide to give 6-nitro-5-propyl-2-[3-(bromomethyl)-5-ethyl-4H-1,2,4 - triazol - 4 - yl] - 3 - (trifluoromethyl)benzophenone.

EXAMPLE 36

7-nitro-8-propyl-1-ethyl-6-(m-trifluoromethylphenyl)-4H-s-triazolo[4,3-a][1,4]benzodiazepine In the manner given in Example 10, 6-nitro-5-propyl-2-[3-(bromomethyl)-5-ethyl - 4H - 1,2,4 - triazol - 4 - yl] 3-(trifluoromethyl)benzophenone was reacted with a saturated solution of ammonia in methanol to give 7-nitro-8-propyl-1-ethyl-6-(m-trifluoromethylphenyl) - 4H - s - triazolo[4.3-a][1,4]benzodiazepine.

In the manner given in the preceding examples, other benzodiazepines can be produced by following the steps II through VIII or alternatively.

II→III→IV→Va→V→VIII or Va→VIa→VIIa→VIII

Representative products, thus obtained, include:

8-chloro-1-ethyl-6-phenyl-4H-s-triazolo[4,3-a][1,4] benzodiazepine;
8-chloro-6-phenyl-4H-s-triazolo[4.3-a][1,4]benzodiazepine;
8-trifluoromethyl-1-methyl-6-phenyl-4H-s-triazolo[4,3-a] [1,4]benzodiazepine;
8-chloro-1-methyl-6-(o-fluorophenyl)-4H-s-triazolo [4,3-a][1,4]benzodiazepine;
7-(ethylthio)-1-propyl-6-(o-bromophenyl)-4H-s-triazolo [4,3-a][1,4]benzodiazepine;
10-(trifluoromethyl)-6-[p-(propionylamino)phenyl]-4H-s-triazolo[4,3-a][1,4]benzodiazepine;
9-propoxy-8-bromo-1-ethyl-6-[m-(ethylsulfinyl)phenyl]-4H-s-triazolo[4,3-a][1,4]benzodiazepine;
9-nitro-8-ethyl-1-propyl-6-[o-(ethylsulfinyl)phenyl]-4H-s-triazolo[4,3-a][1,4]benzodiazepine;
1-methyl-7-fluoro-6-(o-fluorophenyl)-4H-s-triazolo [4,3-a][1,4]benzodiazepine;
1-isopropyl-6-(p-tolyl)-4H-s-triazolo[4,3-a][1,4] benzodiazepine;
1-propyl-7,10-dibromo-6-(p-chlorophenyl)-4H-s-triazolo [4,3-a][1,4]benzodiazepine;
1-ethyl-8-amino-6-(p-nitrophenyl)-4H-s-triazolo [4,3-a][1,4]benzodiazepine;
1-isopropyl-8-fluoro-6-(o-cyanophenyl)-4H-s-triazolo [4,3-a][1,4]benzodiazepine;
1-isopropyl-9-acetamido-7-chloro-6-(m-aminophenyl)-4H-s-triazolo[4,3-a][1,4]benzodiazepine;
7-dimethylamino-6-[o-(methylsulfinyl)phenyl]-4H-s-triazolo[4,3-a][1,4]benzodiazepine;
8-(propylthio)-1-propyl-6-(p-ethoxyphenyl)-4H-s-triazolo[4,3-a][1,4]benzodiazepine;
9-methyl-6-(o-aminophenyl)-4H-s-triazolo[4,3-a][1,4] benzodiazepine;
and the like

EXAMPLE 37

8-chloro - 1 - methyl - 6 - (2,6 - difluorophenyl)-4H-s-triazolo[4,3-a][1,4]benzodiazepine - 4 - carboxylic acid ethyl ester In the manner given in Example 11, a mixture of 8-chloro-1-methyl - 6 - (2,6 - difluorophenyl)-4H-s-triazolo[4,3-a][1,4]benzodiazepine, sodium hydride and diethylcarbonate was heated to reflux to give 8-chloro-1-methyl-6-(2,6-difluorophenyl) - 4H - s - triazolo[4,3-a] [1,4]benzodiazepine-4-carboxylic acid ethyl ester.

EXAMPLE 38

8-chloro-4-ethyl - 1 - methyl-6-(2,6-difluorophenyl)-4H-s-triazolo[4,3-a][1,4]benzodiazepine - 4 - carboxylic acid ethyl ester In the manner given in Example 12, 8-chloro-1-methyl-6-(2,6-difluorophenyl) - 4H - s - triazolo[4,3-a][1,4]benzodiazepine-4-carboxylic acid ethyl ester was treated in the cold with sodium hydride and subsequently with ethyl iodide. The mixture was allowed to warm up and finally was heated to reflux to give 8-chloro-4-ethyl-1-methyl-6-(2,6-difluorophenyl) - 4H - s - triazolo[4,3-a][1,4]benzodiazepine-4-carboxylic acid ethyl ester.

EXAMPLE 39

8-chloro-4-ethyl-1-methyl-6-(2,6-difluorophenyl)-4H-s-triazolo[4,3-a][1,4]benzodiazepine In the manner given in Example 13, 8-chloro-4-ethyl-1-methyl-6-(2,6-difluorophenyl) - 4H - s - triazolo[4,3-a] [1,4]benzodiazepine-4-carboxylic acid ethyl ester was heated to reflux in ethanol with sodium hydroxide, the reaction mixture was finally neutralized and extracted to give 8-chloro-4-ethyl - 1 - methyl-6-(2,6-difluoro-phenyl)-4H-s-triazolo[4,3-a][1,4]benzodiazepine.

EXAMPLE 40

8-chloro - 1 - methyl - 6 - (o-chlorophenyl)-4H-s-triazolo[4,3-a][1,4]benzodiazepine-4-carboxylic acid methyl ester In the manner given in Example 11, a mixture of 8-chloro - 1 - methyl - 6 - (o-chlorophenyl)-4H-s-triazolo[4,3-a][1,4]benzodiazepine, sodium hydride and dimethylcarbonate was heated to reflux to give 8-chloro-1-methyl-6-(o-chlorophenyl) - 4H - s - triazolo[4,3-a][1,4]benzodiazepine-4-carboxylic acid methyl ester.

EXAMPLE 41

8-chloro-1-methyl - 4 - propyl-6-(o-chlorophenyl)-4H-s-triazolo[4,3-a][1,4]benzodiazepine - 4 - carboxylic acid methyl ester In the manner given in Example 12, 8-chloro-1-methyl-6-(o-chlorophenyl) - 4H - s - triazolo[4,3-a][1,4]benzodiazepine-4-carboxylic acid methyl ester was treated in the cold with sodium hydride and subsequently with propyl iodide. The mixture was allowed to warm up and finally was heated to reflux to give 8-chloro-1-methyl-4-propyl-6-(o-chlorophenyl) - 4H - s - triazolo[4,3-a][1,4]benzodiazepine-4-carboxylic acid methyl ester.

EXAMPLE 42

8-chloro-1-methyl-4-propyl-6-(o-chlorophenyl)-4H-s-triazolo[4,3-a][1,4]benzodiazepine In the manner given in Example 13, 8-chloro-1-methyl-4-propyl - 6 - (o-chlorophenyl)-4H-s-triazolo[4,3-a][1,4]benzodiazepine-4-carboxylic acid methyl ester was heated to reflux in ethanol with sodium hydroxide, the reaction mixture was finally neutralized and extracted to give 8-chloro-1-methyl - 4 - propyl-6-(o-chlorophenyl)-4H-s-triazolo[4,3-a][1,4]benzodiazepine.

EXAMPLE 43

1-ethyl-7-nitro - 8 - propyl-6-(m-trifluoromethylphenyl)-4H - s-triazolo[4,3-a][1,4]benzodiazepine-4-carboxylic acid propyl ester In the manner given in Example 11, a mixture of 1-ethyl-7-nitro - 8 - propyl-6-(m-trifluoromethylphenyl)-4H-s-triazolo[4,3-a][1,4]benzodiazepine, sodium hydride and dipropylcarbonate was heated to reflux to give 1-ethyl-7-nitro - 8 - propyl-6-(m-trifluoromethylphenyl)-4H-s-triazolo[4,3-a][1,4]benzodiazepine - 4 - carboxylic acid propyl ester.

EXAMPLE 44

1-ethyl - 4 - isopropyl - 7 - nitro - 8 - propyl-6-(m-trifluoromethylphenyl) - 4H - s - triazolo[4,3-a][1,4]-benzodiazepine-4-carboxylic acid propyl ester In the manner given in Example 12 1-ethyl-7-nitro-8-propyl - 6 - (m-trifluoromethylphenyl) - 4H - s - triazolo[4,3-a][1,4]benzodiazepine-4-carboxylic acid propyl ester was treated in the cold with sodium hydride and subsequently with isopropyl iodide. The mixture was allowed to warm up and finally was heated to reflux to give 1-ethyl - 4 - isopropyl - 7 - nitro - 8 - propyl-6-(m-trifluoromethylphenyl) - 4H - s - triazolo[4,3-a][1,4]benzodiazepine-4-carboxylic acid propyl ester.

EXAMPLE 45

1-ethyl - 4 - isopropyl - 7 - nitro - 8 - propyl-6-(m-trifluoromethylphenyl) - 4H - s - triazolo[4,3-a][1,4]-benzodiazepine In the manner given in Example 13, 1-ethyl-4-isopropyl-7-nitro - 8 - propyl-6-(m-trifluoromethylphenyl)-4H-s-triazolo[4,3-a][1,4]benzodiazepine - 4 - carboxylic acid propyl ester was heated to reflux in ethanol with potassium hydroxide; the reaction mixture was neutralized and extracted to give 1-ethyl-4-isopropyl-7-nitro-8-propyl-6 - (m - trifluoromethylphenyl)-4H-s-triazolo[4,3-a][1,4] benzodiazepine.

In the manner given in the preceding Examples 37 through 45, other 4-alkyl-substituted benzodiazepines of Formula I are prepared by treating a 4-unsubstituted benzodiazepine of Formula VIII with a dialkyl carbonate in the presence of a strong base to obtain the corresponding product IX which is alkylated to give X and decarboxylated with a base to give I in which $R_1$ is an alkyl. Representative compounds thus obtained include:

8-chloro-4-methyl-6-phenyl-4H-s-triazolo[4,3-a][1,4] benzodiazepine;
8-chloro-1-methyl-4-ethyl-6-(o-fluorophenyl)-4H-s-
8-chloro-1-methyl-4-ethyl-6-(o-fluorophenyl)-4H-s-
7-ethylthio-4-ethyl-1-propyl-6-(o-bromophenyl)-4H-s-triazolo[4,3-a][1,4]benzodiazepine;
10-(trifluoromethyl)-4-propyl-6-[p-(propionylamino)phenyl]-4H-s-triazolo[4,3-a][1,4]benzodiazepine;
9-propoxy-8-bromo-1-ethyl-4-isopropyl-6-[m-(ethylsulfinyl)-phenyl]-4H-s-triazolo[4,3-a][1,4]benzodiazepine;
9-nitro-4,8-diethyl-1-propyl-6-[o-(ethylsulfinyl)phenyl]-4H-s-triazolo[4,3-a][1,4]benzodiazepine;
1,4-dimethyl-7-fluoro-6-(o-fluorophenyl)-4H-s-triazolo[4,3-a][1,4]benzodiazepine;
1,4-diisopropyl-6-(p-tolyl)-4H-s-triazolo[4,3-a][1,4] benzodiazepine;
1-propyl-4-methyl-7,10-dibromo-6-(p-chlorophenyl)-4H-s-triazolo-[4,3,-a][1,4]benzodiazepine;
1,4-diethyl-8-amino-6-(p-nitrophenyl)-4H-s-triazolo-[4,3-a][1,4]benzodiazepine;
1,4-diisopropoyl-8-fluoro-6-(o-cyanophenyl)-4H-s-triazolo[4,3-a][1,4]benzodiazepine;
1-isoproplyl-4-methyl-9-acetamido-7-chloro-6-(m-aminophenyl)-4H-s-triazolo[4,3-a][1,4]benzodiazepine;
7-dimethylamino-4-ethyl-6-[o-(methylsulfinyl)phenyl] 4H-s-triazolo-[4,3,-a][1,4]benzodiazepine;
8-(propylthio)-1,4-dipropyl-6-(p-ethoxyphenyl)-4H-s-triazolo[4,3-a][1,4]benzodiazepine;
4,9-dimethyl-6-(o-aminophenyl)-4H-s-triazolo[4,3-a][1,4]benzodiazepine;

and the like.

What is claimed is:

1. A process for the production of triazolobenzodiazepines of the Formula VIII:

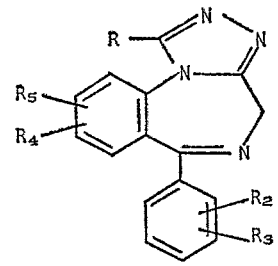

VIII wherein R is selected from the group consisting of hydrogen and alkyl of 1 to 3 carbon atoms, inclusive; wherein $R_2$, $R_3$, $R_4$, and $R_5$ are selected from the group consisting of hydrogen, alkyl defined as above, fluorine, chlorine, bromine, nitro, cyano, trifluoromethyl, alkoxy of 1 to 3 carbon atoms, inclusive, amino, alkanoylamino, in which the alkanoyl group is of 1 to 3 carbon atoms, inclusive, alkylthio in which the alkyl group is defined as above, alkylsulfinyl in which the alkyl group is defined as above, and dialkylamino in which the alkyl group is defined as above, the steps which comprise:
(1) heating a 2-chloro-4-phenylquinoline of the Formula II:

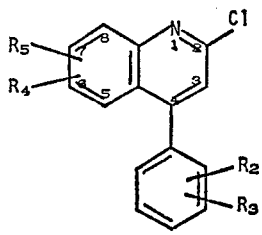

wherein $R_2$, $R_3$, $R_4$, and $R_5$ are defined as above, with hydrazine hydrate to give the corresponding 2-hydrazino-4-phenylquinoline of the Formula III:

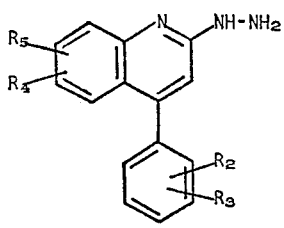

wherein $R_2$, $R_3$, $R_4$, and $R_5$ are defined as above;
(2) Refluxing III with a trialkyl ortho-acylate $(R'O)_3C$—R in which R' is an alkyl of 1 to 3 carbon atoms, inclusive, and R is defined as above, to give the corresponding 1-substituted-5-phenyl-s-triazolo[4,3-a]quinoline of the Formula IV:

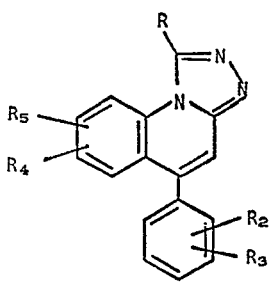

wherein R, $R_2$, $R_3$, $R_4$, and $R_5$ are defined as above;
(3) Treating IV with an oxidizing agent or system in an inert solvent to obtain the corresponding 2-(3-substituted-4H-1,2,4-triazol-4-yl)benzophenone of the Formula V:

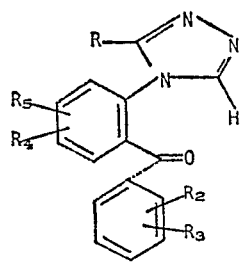

wherein R, $R_2$, $R_3$, $R_4$, and $R_5$ are defined, as above;
(4) Treating V with formaldehyde to obtain the corresponding 2-[3-(hydroxymethyl)-5-substituted-4H-1,2,4-triazol-4-yl]benzophenone of Formula VI:

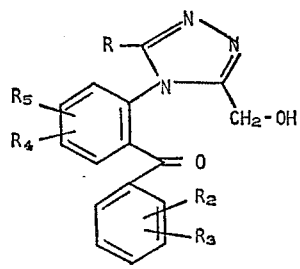

wherein R, $R_2$, $R_3$, $R_4$, and $R_5$ are defined as above;
(5) Treating VI with a halogenating agent to obtain the corresponding 2-[3-(halomethyl)-5-substituted-4H-1,2,4-triazol-4-yl]benzophenone of Formula VII:

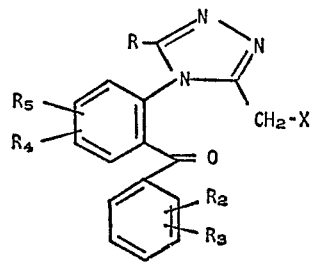

wherein R, $R_2$, $R_3$, $R_4$, and $R_5$ are defined as above, and X is selected from the group consisting of chlorine, bromine, and iodine; and
(6) Treating VII with ammonia to give the corresponding 6-phenyl-4H-s-triazolo[4,3-a][1,4]benzodiazepine of Formula VIII above.

2. The process of claim 1, wherein in step 2 the compound III is refluxed with triethyl ortho-acetate.

3. The process of claim 1 wherein in step 3 the oxidizing system is sodium periodate and ruthenium dioxide in aqueous acetone.

4. The process of claim 1 wherein in step 4 the formaldehyde used is solid paraformaldehyde.

5. The process of claim 1 wherein in step 5 the halogenating agent is phosphorus tribromide.

6. The process of claim 1 wherein in step 2 triethyl orthoformate is used.

7. The process of claim 1 wherein the starting compound is 2,6-dichloro-4-phenylquinoline.

8. The process of claim 1 wherein the starting compound is 2,6-dichloro-4-(o-chlorophenyl)quinoline.

9. The process of claim 1 wherein the starting compound is 2,6-dichloro-4-(2,6-difluorophenyl)quinoline.

10. A process for the production of a benzodiazepine of Formula I (when $R_1$ is alkyl):

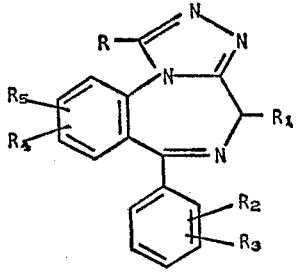

wherein R is selected from the group consisting of hydrogen, alkyl of 1 to 3 carbon atoms, inclusive; wherein $R_1$ is alkyl, defined as above; wherein $R_2$, $R_3$, $R_4$, and $R_5$ are selected from the group consisting of hydrogen, alkyl defined as above, fluorine, chlorine, bromine, nitro, cyano, trifluoromethyl, alkoxy of 1 to 3 carbon atoms, inclusive, amino, alkanoylamino, in which the alkanoyl group is of 1 to 3 carbon atoms, inclusive, alkylthio in which the alkyl group is defined as above, alkyl-sulfinyl in which the alkyl group is defined as above, and dialkylamino in which the alkyl group is defined as above, which comprises:

(1) reacting a benzodiazepine of the Formula VIII:

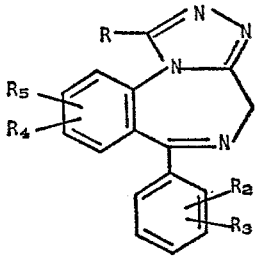

VIII wherein R, $R_2$, $R_3$, $R_4$, and $R_5$ are defined as above, with a lower dialkyl carbonate in the presence of a strong base to give the ester of Formula IX:

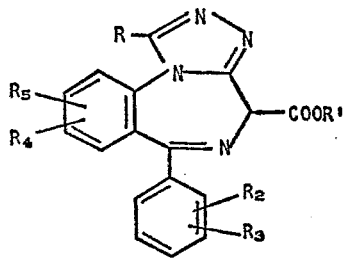

IX wherein R, $R_2$, $R_3$, $R_4$, and $R_5$ are defined as above and wherein R' is a lower alkyl of 1 to 3 carbon atoms;

(2) Treating IX with a strong base and an alkyl halide $R_1X$ in which the alkyl group $R_1$ is of 1 to 3 carbon atoms, inclusive, to give a compound of Formula X:

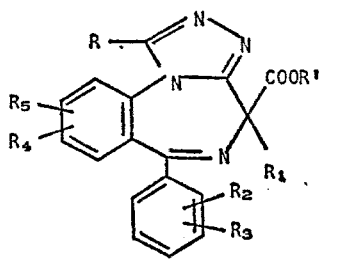

X wherein R', R, $R_1$, $R_2$, $R_3$, $R_4$, and $R_5$ are defined as above; and (3) Treating X with an alkali metal hydroxide and subsequently neutralizing to obtain the benzodiazepine of the Formula I above, wherein $R_1$ is alkyl.

11. The process of claim 10 wherein the dialkyl carbonate is diethyl carbonate and the strong base is sodium hydride.

12. The process of claim 10 wherein the alkyl halide is methyl iodide.

13. The process of claim 10, wherein the alkali metal hydroxide is sodium hydroxide.

References Cited

Meguro et al., Tetrahedron Letters No. 47, pp. 4039–4042 (1970).

ALTON D. ROLLINS, Primary Examiner

U.S. Cl. X.R.

260—247.1, 247.2 A, 247.5 R, 268 MK, 283 R, 283 S, 286 R, 287 R, 288 R, 289 R, 293.69, 562 B; 424—269